US012757874B2

(12) United States Patent
Chang et al.

(10) Patent No.: US 12,757,874 B2
(45) Date of Patent: Oct. 13, 2026

(54) SYSTEM AND METHOD FOR TESTING POULTRY RESPONSE

(71) Applicant: iChase Co., Ltd., Taipei City (TW)

(72) Inventors: Kuang-fu Chang, Taipei City (TW); Li-wan Huang, Taipei City (TW); Ying-chieh Chen, Taipei City (TW)

( * ) Notice: Subject to any disclaimer, the term of this patent is extended or adjusted under 35 U.S.C. 154(b) by 271 days.

(21) Appl. No.: 18/513,595

(22) Filed: Nov. 19, 2023

(65) Prior Publication Data

US 2024/0206434 A1 Jun. 27, 2024

(51) Int. Cl.

*A01K 29/00* (2006.01)
*A01K 45/00* (2006.01)
*G06T 7/00* (2017.01)
*G06T 7/11* (2017.01)

(52) U.S. Cl.

CPC ............ *A01K 29/005* (2013.01); *A01K 45/00* (2013.01); *G06T 7/0002* (2013.01); *G06T 7/11* (2017.01); *G06T 2207/30242* (2013.01)

(58) Field of Classification Search

CPC .................. A01K 29/005; A01K 45/00; G06T 2207/30242; G06T 7/0002; G06T 7/0004; G06T 7/11; G06V 10/50; G06V 20/52; G06V 20/53; G06V 40/20

See application file for complete search history.

(56) References Cited

U.S. PATENT DOCUMENTS

2023/0172167 A1* 6/2023 Eftelioglu ............ A01K 29/005 340/573.1
2025/0194568 A1* 6/2025 De Samber ............ A01K 31/18

FOREIGN PATENT DOCUMENTS

TW I634526 B 9/2018

* cited by examiner

*Primary Examiner* — Kenny A Cese

(74) *Attorney, Agent, or Firm* — OPES IP Consulting Co., Ltd.

(57) ABSTRACT

A system for testing poultry response is disclosed. The system comprises a camera, a processor, a beam generator, and a beam direction control unit. The camera is configured to receive a plurality of first images of a poultry house, and the plurality of first images include at least one of the poultry area and the background area. The processor is configured to calculate a first activity according to the plurality of first images, and to determine whether the first activity is lower than a target activity threshold. The beam generator is configured to emit a beam. The beam direction control unit is configured to move the beam. If the first activity is lower than the target activity threshold, the beam is emitted through the beam generator, and the beam is moved through the beam direction control unit, so as to disturb the plurality of poultry in the poultry house.

6 Claims, 7 Drawing Sheets

SYSTEM AND METHOD FOR TESTING POULTRY RESPONSE

CROSS-REFERENCE TO RELATED APPLICATIONS

The present application claims the benefit of Taiwan patent application NO. 111149318 filed on Dec. 21, 2022, the disclosure of which is incorporated herein by reference.

FIELD OF INVENTION

The present disclosure relates to a system and method for a test, and in particular to a system and method for testing poultry response.

BACKGROUND OF INVENTION

According to experiences of breeders, health of poultry would be reflected in physiological information such as response or sound of the poultry. Breeders need to patrol the poultry house to collect health status of the poultry.

However, frequent access to the poultry house is time-consuming and labor-intensive, and risk of poultry contracting infectious diseases is increased.

SUMMARY OF INVENTION

Technical Problems

A main purpose of the present disclosure is to establish a system for testing poultry response, so as to collect information of poultry responses, to help breeders master health status of poultry promptly, and to reduce the burden of the poultry house management.

Technical Solutions

In order to achieve the foregoing purpose of the present disclosure, the present disclosure provides a system for testing poultry response, comprises: a camera, configured to receive a plurality of first images of a poultry house, and the plurality of first images include at least one of a poultry area and a background area; a processor, configured to calculate a first activity according to the plurality of first images, and to determine whether the first activity is lower than a target activity threshold; a beam generator, configured to emit a beam; and a beam direction control unit, configured to move the beam, wherein if the first activity is lower than the target activity threshold, the beam emitted by the beam generator and the beam moved by the beam direction control unit disturb poultry in the poultry house.

According to another aspect of the present disclosure, a method for testing poultry response is disclosed. The method for testing poultry response comprises the following steps of: receiving a plurality of first images of a poultry house, and the plurality of first images include at least one of a poultry area and a background area; calculating a first activity according to the plurality of first images; determining whether the first activity is lower than a target activity threshold; and emitting a beam emitted and moving the beam to disturb poultry in the poultry house if the first activity is lower than the target activity threshold.

The invention will become apparent from the following detailed description of the preferred but non-limiting embodiments. The following description is made with reference to the accompanying drawings.

DESCRIPTION OF DRAWINGS

In order to more clearly illustrate the above contents of the present disclosure, the following is a detailed description of the preferred embodiments with reference to the accompanying drawings.

DETAILED DESCRIPTION OF PREFERRED EMBODIMENTS

Figure 1:
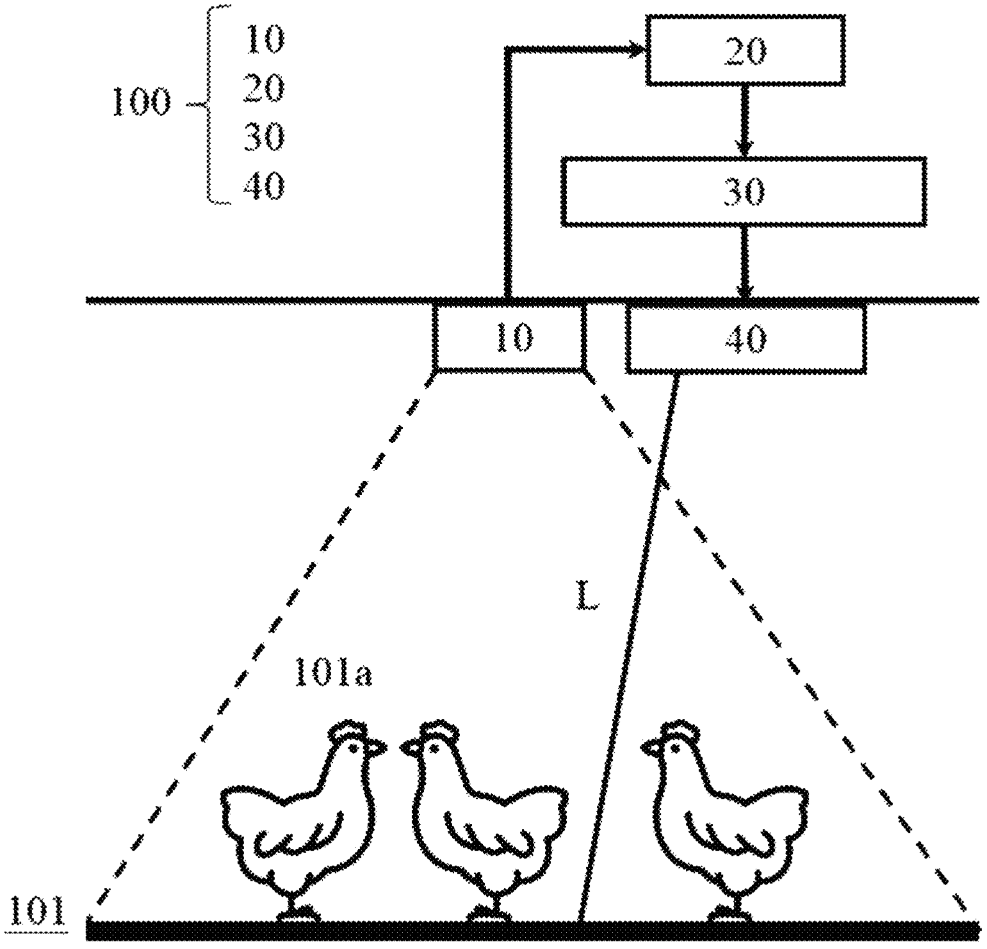
FIG. 1 shows a schematic diagram of a system for testing poultry response according to an embodiment of the present disclosure.
Figure 2:
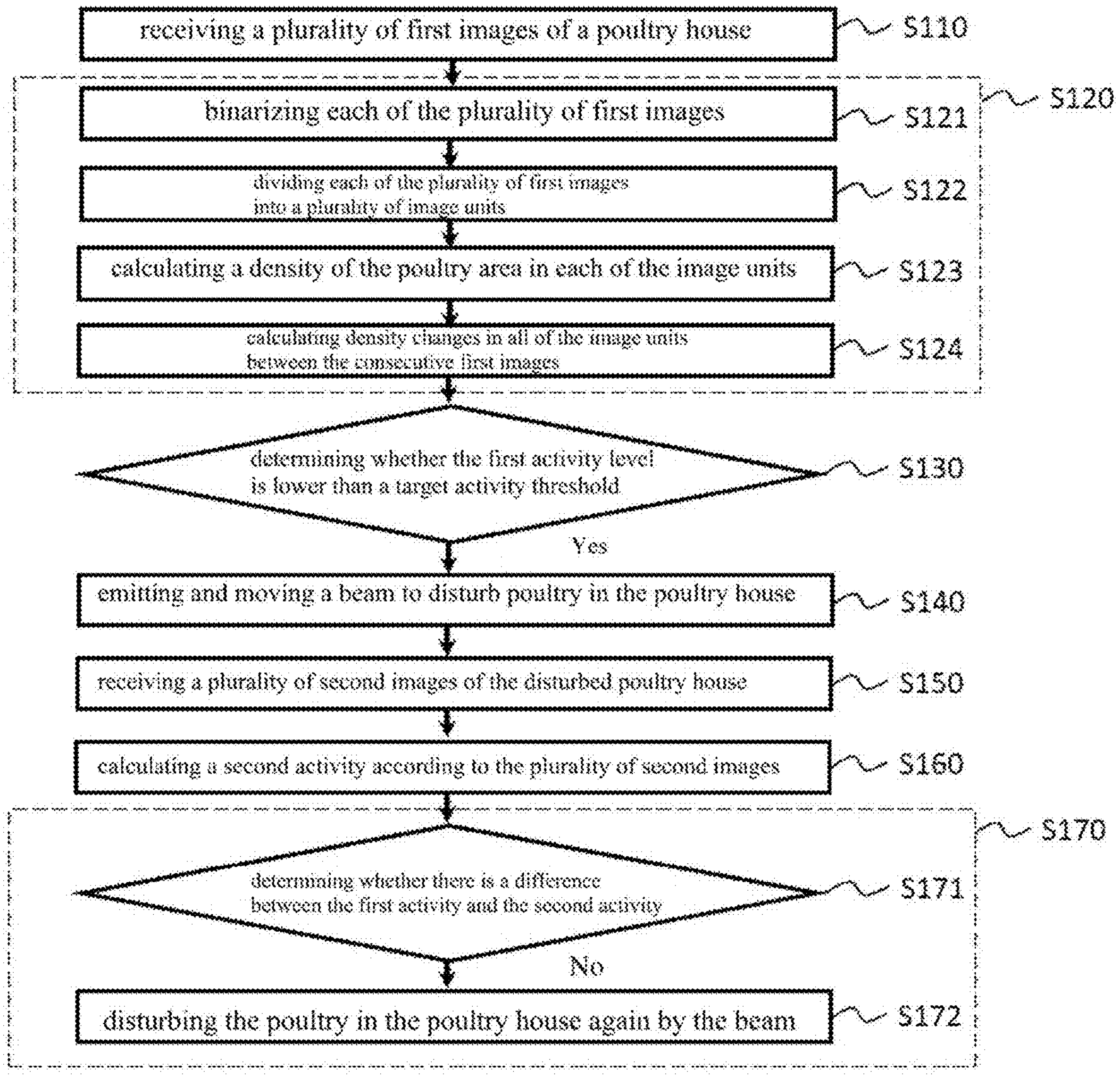
FIG. 2 shows a flowchart of a method for testing poultry response according to an embodiment of the present disclosure.

Please refer to FIG. 1 and FIG. 2. FIG. 1 shows a schematic diagram of a system 100 for testing poultry response according to an embodiment of the present disclosure, and FIG. 2 shows a flowchart of a method for testing poultry response according to an embodiment of the present disclosure.

The system 100 for testing poultry response includes a camera 10, a processor 20, a beam generator 30, and a beam direction control unit 40.

The flow chart of the method for testing poultry response of the system 100 for testing poultry response is illustrated below with FIG. 2, in which at least steps of S110, S120, S130, S140, S150, S160, and S170 are included, which are described in detail as follows.

In the step of S110, the camera 10 receives a plurality of first images of a poultry house, where the plurality of first images include at least one of a poultry area and a background area. In one embodiment, the camera 10 may be a visible light camera and/or an infrared camera. The camera 10 may receive visible light, infrared light, or 3D scenes to monitor beam L (e.g., laser) emitted by the light beam generator 30 to calculate activity of poultry. In one embodiment, the camera 10 may be connected to the beam generator 30 (such as a laser generator or a laser module), may be connected to a rotating mechanism, or may be independent of the beam generator 30 and the rotating mechanism, which is not limited thereto.

In the step of S120, the processor 20 calculates a first activity according to the plurality of first images.

There are many processes for calculating a first activity based on the plurality of first images P1 in the step of S120. One of the processes is described below with the steps of S121 to S124.

Figure 3A:
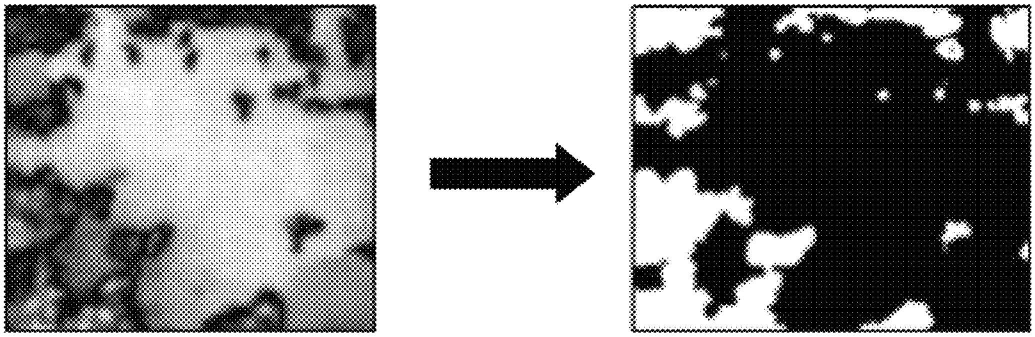
FIG. 3A to FIG. 3D show schematic diagrams of a method for calculating activity according to an embodiment of the present disclosure.

Please refer to FIG. 3A. In the step of S121, the processor 20 is further configured to binarize each of the plurality of first images P1 to distinguish the poultry area and the background area of each of the plurality of first images P1. In one embodiment, continuous thermal images (e.g., detected by an infrared device) may be binarized to distinguish the poultry areas from the background areas. As shown in FIG. 3A, in the binarized images, the poultry area is represented by white, and the background area is represented by black.

Figure 3B:
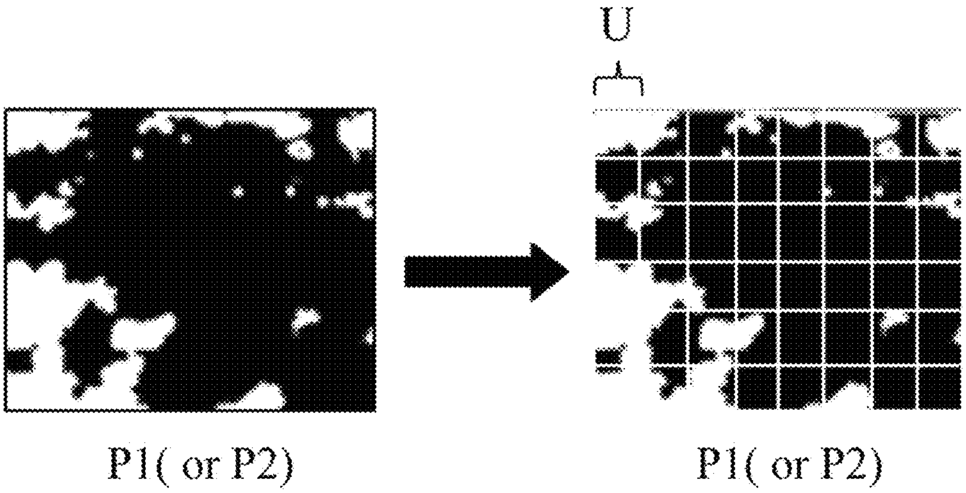

Please refer to FIG. 3B. In the step of S122, the processor 20 is further configured to divide each of the plurality of first images P1 into a plurality of image units U. In an embodiment, the first image P1 may be divided into n gray scale units of 10×10 pixel. As shown in FIG. 3B, the binarized images may be divided into a plurality of image units.

Figure 3C:
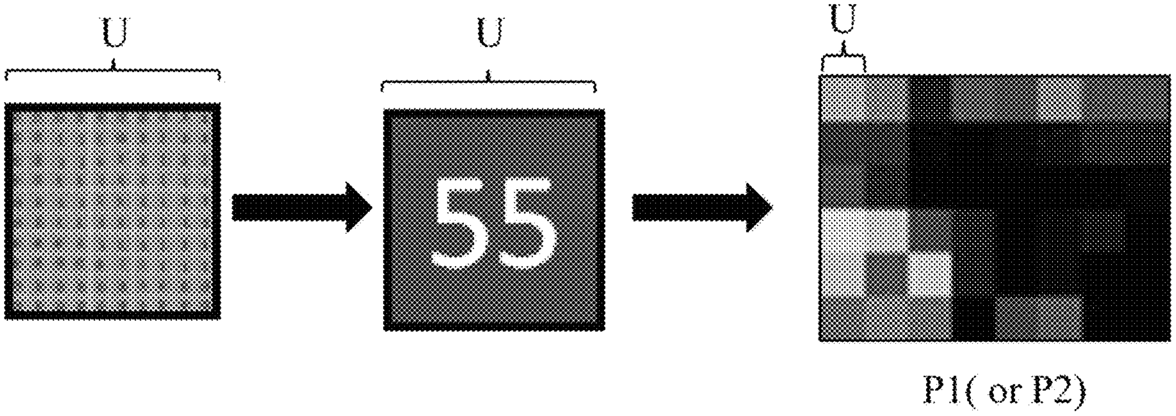

Please refer to FIG. 3C. In the step of S123, the processor 20 is further configured to calculate a density of the poultry area in each of the image units U. In one embodiment, for each of the binarized image units U, if the poultry area is larger than the background area, the score is 1. If the poultry area is smaller than the background area, the score is 0. A total score is calculated to represent the density of the poultry area in each of the image units. In one embodiment, for each of the binarized image units U, white represents the poultry area and is given a score of 1, and black represents the background area and is given a score of 0. The whiter the color of the image unit is, the higher a density of the poultry in the image unit is (0-100). As shown in FIG. 3C, in the area of 10×10 pixel in each of the image units U, if the poultry area is larger than the background area, the score is 1, while if the poultry area is smaller than the background area, the score is 0. A total score (for example, of 55) is calculated to represent a density of the poultry area in the image unit U, and finally the density of the poultry area in each of the image units U can be integrated into a density distribution of the poultry area of the first image.

Figure 3D:
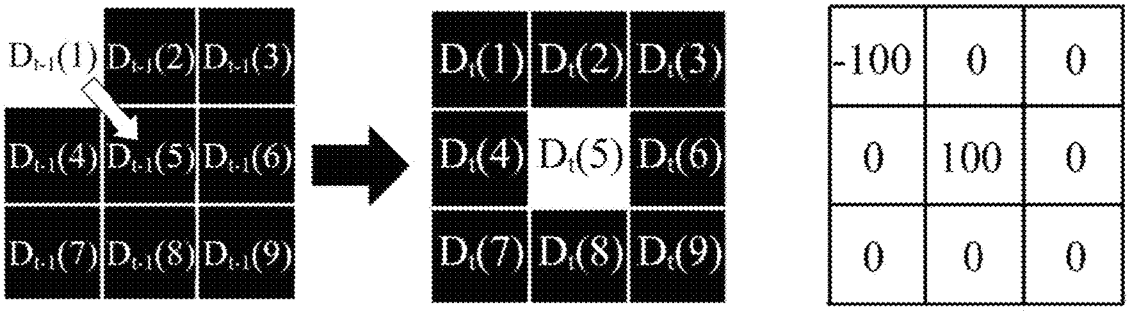

Please refer to FIG. 3D. In the step of S124, the processor 20 is further configured to calculate density changes in all of the image units U between the consecutive first images P1, and to calculate a sum of the density changes in all of the image units U, so as to obtain the first activity. In one embodiment, the density change of each of the image units U can be obtained by subtracting each of the image units U in the two consecutive first images P1 and taking an absolute value. For example, the density change of each of the image units U can be obtained by the formula:

$$\text{activity } (t) = \frac{\sum_{i=1}^{n} |D_t(i) - D_{t-1}(i)|}{D_{t-1}(i)} \times 100\%.$$

A sum of the density changes in all of the image units U is calculated to obtain the first activity. As shown in FIG. 3D, if the first image P1 has 9 image units U that have been scored, they are represented by positions D (1) to D (9). At a time point of t−1, a position $D_{t-1}(1)$ is completely white, indicating a density of a poultry area with a score of 100, while other positions are all black, indicating a density of a poultry area with a score of 0. That is, during a period from a time point of t−1 to a time point of t, the poultry moves from a position D(1) to a position D(5), so that the density change of the position D(1) is −100, and the density change of the position D(5) is 100. A sum of the absolute values of the density changes at all of the positions D(1) to D(9) is accumulated to calculate the poultry activity during the time point t−1 to the time point t.

In one embodiment, the camera 10 (including visible light cameras and infrared thermal imaging cameras), the beam generator 30, the beam direction control unit 40, etc. can be integrated with the processor 20 (such as an embedded system with Raspberry Pi), so as to establish a poultry image response assessing system which can be installed at a high place and parallel to the ground. The system can use activity status values to determine whether to turn on a beam (such as a laser) to perform a response test. In one embodiment, when a response test is performed, activity changes and image records can be collected by the system before scanning (2 minutes), during scanning (1 minute), and after scanning (2 minutes). Then, edge computing is performed through a processor such as Raspberry Pi and the activity status changes and image records are uploaded to a cloud system (not shown).

In one embodiment, the value of the first activity obtained from the above steps of S121 to S124 can be uploaded to a cloud system (not shown) to monitor the activity of the poultry in the commercial poultry house. In one embodiment, in the short-term activity monitoring of poultry, a frequency of calculating the activity value of poultry is 1 second. In one embodiment, for long-term activity monitoring of poultry, an experimental poultry house is equipped with environmental control equipment such as fans and sprays. Research has found that in the monitoring of poultry activity according to the steps of S121 to S124 above, an activity value of the poultry during the day is higher than that of the poultry at night since the poultry are born with night blindness. Experiments have confirmed the feasibility of calculating activity through density changes.

Other methods of the process of calculating the first activity according to the first images P1 of the step of S120 may including: using cameras and optical flow to detect the poultry activity (see M. S. Dawkins, R. Cain, and S. J. Roberts, "Optical flow, flock behaviour and chicken welfare," Animal Behaviour, vol. 84(1), pp. 219-223, 2012. F. M. Colles, R. J. Cain, T. Nickson, A. L. Smith, S. J. Roberts, M. C. Maiden, D. Lunn, and M. S. Dawkins, "Monitoring chicken flock behaviour provides early warning of infection by human pathogen *Campylobacter*," Proceedings of the Royal Society B: Biological Sciences, vol. 283(1822), 20152323, 2016), using the pixel intensity changes in consecutive images to assess activity indicators (see Youssef, V. Exadaktylos, and D. A. Berckmans, "Towards real-time control of chicken activity in a ventilated chamber," Biosystems Engineering, 135, pp. 31-43, 2015. G. A. Fraess, C. J. Bench, and K. B. Tierney, "Automated behavioural response assessment to a feeding event in two heritage chicken breeds," Applied Animal Behaviour Science, 179, pp. 74-81, 2016), using an algorithm by using infrared thermal images to calculate changes of the poultry density to calculate the poultry activity (see C. González, R. Pardo, J. Fariña, M. D. Valdés, J. J. Rodriguez-Andina, and M. Portela, "Real-time monitoring of poultry activity in breeding farms," IECON 2017-43rd Annual Conference of the IEEE Industrial Electronics Society, IEEE, pp. 3574-3579, 2017), and combining with deep learning object detection model and multi-object tracking to record the poultry activity trajectories to calculate the activity (see Khairunissa, Jasmine, et al. "Detecting poultry movement for poultry behavioral analysis using the Multi-Object Tracking (MOT) algorithm." 2021 8th International Conference on Computer and Communication Engineering (ICCCE). IEEE, 2021).

In the step of S130, the processor 20 is further configured to determine whether the first activity level is lower than a target activity threshold. As used herein, the target activity threshold refers to a minimum warning value, and the minimum warning value calculated according to the above steps of S121 to S124 may be set, for example, to 10. When a value of the activity according to the above steps of S121 to S124 less than the minimum warning value (for example, set to 10) is detected, the poultry may be in a rest state or heat stress state. As used herein, the term "heat stress" refers to an animal body overheats, and cannot get rid of excess heat, and a temperature of the animal rises rapidly, thereby affecting health status of the animal. Generally, causes of hyperthermia include endogenous and exogenous. For example, excessive heat may be produced in the body of the poultry due to restlessness by external disturbances (such as light, close feeding, catch and release process) and strenuous exercise, which is the endogenous hyperthermia. The heat from the external environment may be introduced into the body due to the high ambient temperature, which is the exogenous hyperthermia.

In the step of S140, if the first activity is lower than the target activity threshold, the beam L is emitted by the beam generator 30, and the beam L is moved by the beam direction control unit 40, so as to disturb poultry 101*a* in the poultry house 101.

Figure 4A:
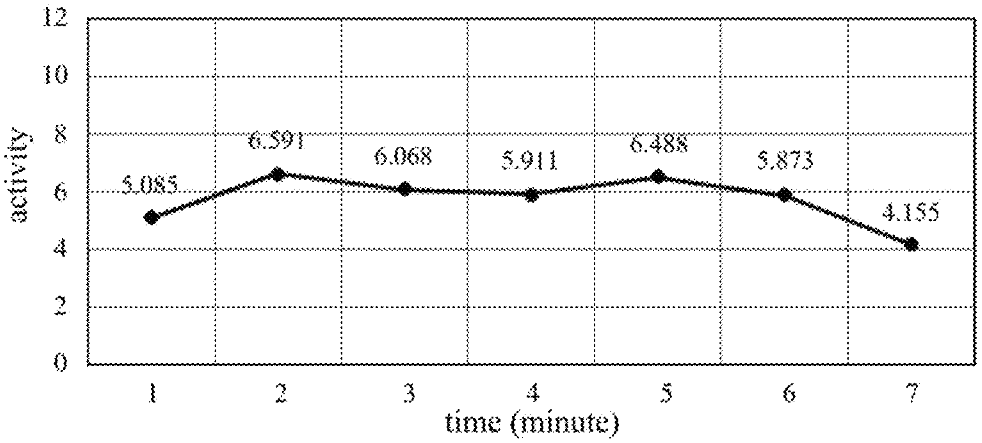
FIG. 4A shows a schematic diagram of an activity of poultry stimulated by laser according to an embodiment of the present disclosure, in which laser scanning stimulation is performed at the fourth minute in FIG. 4A.
Figure 4B:
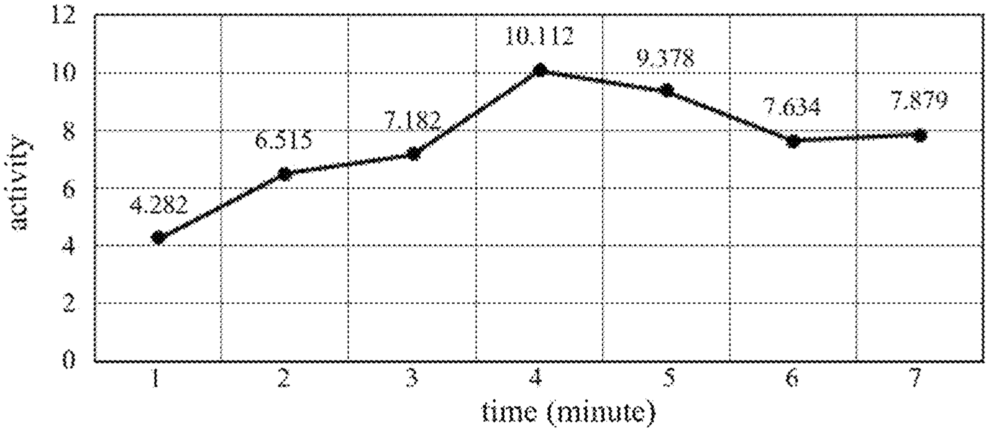
FIG. 4B shows a schematic diagram of an activity of poultry stimulated by laser according to an embodiment of the present disclosure, in which a laser fixed-point stimulation is performed at the fourth minute in FIG. 4B.

In one embodiment, the beam generator 30 may be, for example, a laser generator, and the beam direction control unit 40 may be, for example, a galvanometer module. In this way, laser is used as the stimulation source, different stimulation methods are used to stimulate the poultry, and the response effect of the poultry is determined through the images and the changes of activity. As shown in FIG. 4A, at the time point of 4 minutes, the poultry was stimulated by laser scanning and the activity was monitored. As shown in FIG. 4B, at the time point of 4 minutes, fixed-point laser stimulation was performed on the poultry, and activity monitoring was performed. From the comparison of FIG. 4A and FIG. 4B, it can be seen that the laser stimulation by scanning was too dynamic and thus had no obvious stimulating effect on the poultry, while the fixed-point laser stimulation was more likely to arouse the curiosity of the poultry, and thus easily caused the poultry to gather.

In another embodiment, the beam generator 30 may further be, for example, a laser generator, and the beam direction control unit 40 may be, for example, a biaxial rotation mechanism, especially a dual-axis rotation mechanism which can rotate in a direction of X-axis or Y-axis respectively. In another embodiment, the beam generator 30 may be, for example, a laser generator, and the beam direction control unit 40 may be, for example, a rotating shaft, wherein a mirror on the rotating shaft can change a direction of the laser. In another embodiment, the beam generator 30 may be, for example, a laser module with multiple laser generators, and the beam direction control unit 40 may be, for example, a single-axis or dual-axis rotation mechanism, which can provide multiple stimulation sources in the poultry house 101 at the same time, so as to increase differences in the responses before and after the stimulations.

In the step of S150, the camera 10 further receives a plurality of second images P2 of the disturbed poultry house 101, and the plurality of second images P2 include at least one of the poultry area and the background area.

In the step of S160, the processor 20 is further used to calculate a second activity according to the plurality of second images P2. There are many processes for calculating the first activity based on the plurality of second image P2 in the step of S160, one of which can be implemented by referring to the steps S121 to S124 described above, which will not be described again to avoid redundancy.

In the step of S170, the processor 20 is further used to compare the first activity and the second activity to asses a response.

In the step of S170, there are many processes for comparing the first activity and the second activity to assess a response, one of which is described below with the steps of S171-S172.

In the step of S171, the processor 20 is further configured to determine whether there is a difference between the first activity and the second activity.

Figure 5A:
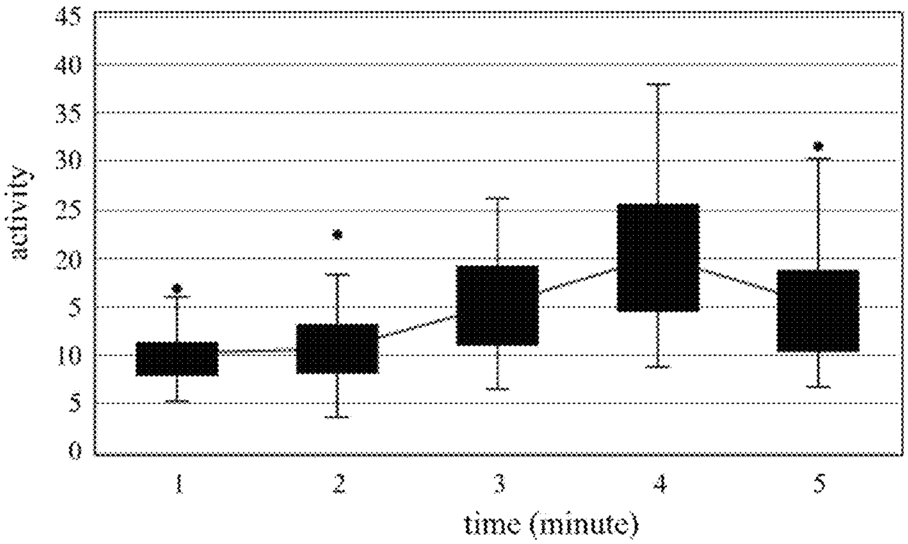
FIG. 5A shows a schematic diagram of a significant difference test in activity of 4-6 week old poultry before and after laser stimulation according to an embodiment of the present disclosure.
Figure 5B:
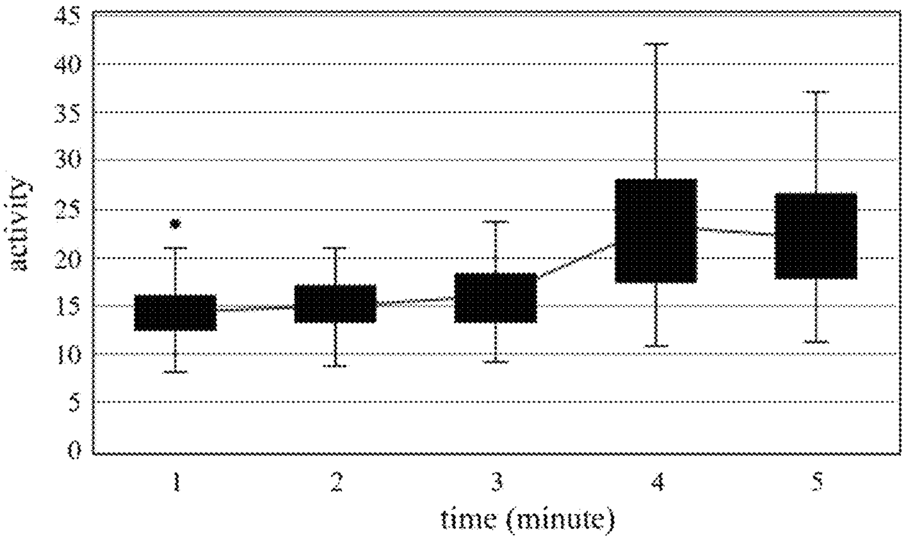
FIG. 5B shows a schematic diagram of a significant difference test in activity of 7-10 week old poultry before and after laser stimulation according to an embodiment of the present disclosure.

In one embodiment, a test for statistical significance was performed on the activity of the poultry before and after the laser stimulation, so as to assess the responses. A test for estimating the difference between the population means was performed on the activity changes of the 4 to 6 week old (individual n=44) (as shown in FIG. 5A) and 7 to 10 week old (individual n=63) (as shown in FIG. 5B) poultry during the response test. Please refer to FIG. 5A. A p-value for a difference test for the activity at the 1-minute time point and the activity at the 2-minute time point is 0.55, a p-value for a difference test for the activity at the 2-minute time point and the activity at the 3-minute time point is <0.001, and a p-value for a difference test for the activity at the 3-minute time point and the activity at the 4-minute time point is <0.001. Please refer to FIG. 5B. A p-value for a difference test for the activity at the 1-minute time point and the activity at the 2-minute time point is 0.49, a p-value for a difference test for the activity at the 2-minute time point and the activity at the 3-minute time point is 0.15, and a p-value for a difference test for the activity at the 3-minute time point and the activity at the 4-minute time point is <0.001. It can be seen that there is no significant difference between the activities at two minutes before the laser stimulation ($p>0.05$), indicating that the activity status of the poultry before the stimulation is consistent and close to the set threshold. There is a significant difference in the activities of 4-6 weeks old poultry before the laser stimulation and at the moment of the stimulation ($p<0.01$), indicating that the activity of the poultry changed due to the attraction of the laser stimulation. There is a significant difference ($p<0.01$) in the activity of the poultry under the laser stimulation and after the laser is turned off, indicating that the activity of the poultry changes after the laser is turned off. In addition, it is able to be observed by a video that most of the poultry went foraging for food.

In the step of S172, if there is no difference between the first activity and the second activity ($p>0.05$), the beam L is emitted by the beam generator 30 again, and the beam L is moved by the beam direction control unit 40 again, so as to disturb the poultry 101*a* in the poultry house 101 again, and an alert is issued.

Figure 6A:
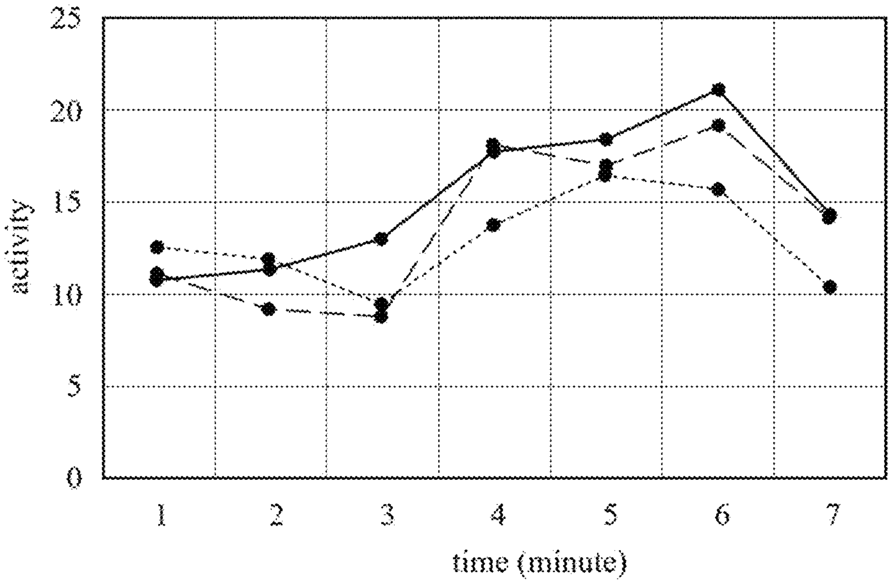
FIG. 6A shows a schematic diagram of an activity of poultry in a normal state according to an embodiment of the present disclosure.
Figure 6B:
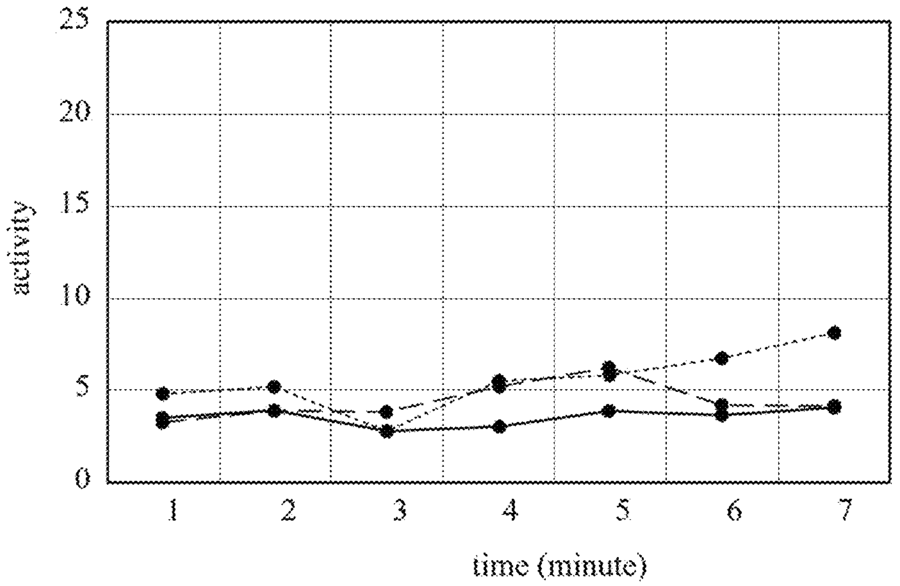
FIG. 6B shows a schematic diagram of an activity of poultry in a thermal stress state according to an embodiment of the present disclosure.

In one embodiment, a collection of data of heat stress response was performed. As shown in FIG. 6A, at a time point of 4 minutes, responses of the poultry with less activity in a normal state were assessed by the laser stimulation. In addition, as shown in FIG. 6B, the heat stressed poultry were subjected to the laser stimulation to assess the response thereof at the time point of 4 minutes. It can be seen that the activity of the poultry in the normal state was increased significantly after the laser stimulation (see FIG. 6A), while the activity of the poultry in the heat stress state remained a reduced state after the laser stimulation (see FIG. 6B). Therefore, the system 100 and method for testing poultry response of the present disclosure may be configured to detect the poultry in the heat stress state, which can help breeders master the health status of the poultry promptly, and reduce the burden of the poultry house management.

As mentioned, while the preferred embodiments of the present disclosure have been described above, it will be recognized and understood that various changes and modifications can be made, and the appended claims are intended to cover all such changes and modifications which may fall within the spirit and scope of the present disclosure.

What is claimed is:

1. A system for testing poultry response, comprising:
- a camera, configured to receive a plurality of first images of a poultry house, and the plurality of first images include at least one of a poultry area and a background area;
- a processor, configured to:
  - binarize each of the plurality of first images to distinguish the poultry area and the background area of each of the plurality of first images,
  - divide each of the plurality of first images into a plurality of image units,
  - calculate a density of the poultry area in each of the plurality of image units,
  - calculate density change in all of the plurality of image units between the consecutive first images,
  - calculate a sum of the density changes in all of the plurality of image units to obtain the first activity, and
  - determine whether the first activity is lower than a target activity threshold;
- a beam generator, configured to emit a beam; and
- a beam direction control unit, configured to move the beam,
- wherein if the first activity is lower than the target activity threshold, the beam is emitted by the beam generator, and the beam is moved by the beam direction control unit, so as to disturb poultry in the poultry house,
- wherein the camera is further configured to receive a plurality of second images of the disturbed poultry house, and the plurality of second images include at least one of the poultry area and the background area;
- wherein the processor is further configured to calculate a second activity according to the plurality of second images; and to compare the first activity with the second activity to assess a response, wherein a step of comparing the first activity with the second activity to assess the response includes steps of:
  - determining whether there is a difference between the first activity and the second activity; and
  - emitting the beam by the beam generator and moving the beam by the beam direction control unit again if there is no difference between the first activity and the second activity, so as to disturb the poultry in the poultry house again, and issuing an alert.

2. The system for testing poultry response as claimed in claim 1, wherein the processor is further configured to upload the first activity and the second activity to a cloud system.

3. The system for testing poultry response as claimed in claim 1, wherein in a step of calculating the density of the poultry area in each of the plurality of image units, the processor is further configured to score an image unit in which the poultry area is larger than the background area as 1, and score an image unit in which the poultry area is smaller than the background area as 0 for each of the plurality of image units, and calculate a total score to represent the density of the poultry area in each of the plurality of image units.

4. A method for testing poultry response, comprising steps of:
- receiving a plurality of first images of a poultry house, and the plurality of first images include at least one of a poultry area and a background area;
- binarizing each of the plurality of first images to distinguish the poultry area and the background area of each of the plurality of first images;
- dividing each of the plurality of first images into a plurality of image units;
- calculating a density of the poultry area in each of the plurality of image units;
- calculating density change in all of the plurality of image units between the consecutive first images;
- calculating a sum of the density changes in all of the plurality of image units to obtain the first activity;
- determining whether the first activity is lower than a target activity threshold; and
- emitting a beam emitted and moving the beam to disturb poultry in the poultry house if the first activity is lower than the target activity threshold;
- receiving a plurality of second images of the disturbed poultry house, and the plurality of second images include at least one of the poultry area and the background area;
- calculating a second activity according to the plurality of second images;
- comparing the first activity with the second activity to assess a response, wherein a step of comparing the first activity with the second activity to assess the response includes steps of:
  - determining whether there is a difference between the first activity and the second activity; and
  - emitting the beam and moving the beam again if there is no difference between the first activity and the second activity, so as to disturb the poultry in the poultry house again, and issuing an alert.

5. The method for testing poultry response as claimed in claim 4, wherein the method further comprises a step of uploading the first activity and the second activity to a cloud system.

6. The method for testing poultry response as claimed in claim 4, wherein in a step of calculating the density of the poultry area in each of the plurality of image units, for each of the plurality of image units, an image unit in which the poultry area is larger than the background area is given a score of 1, and an image unit in which the poultry area is smaller than the background area is given a score of 0, and a total score is calculated to represent the density of the poultry area in each of the plurality of image units.

* * * * *